United States Patent
Lu et al.

(10) Patent No.: US 11,447,837 B2
(45) Date of Patent: Sep. 20, 2022

(54) COMBINED FABRICATING METHOD FOR GRADIENT NANOSTRUCTURE IN SURFACE LAYER OF METAL WORKPIECE

(71) Applicant: JIANGSU UNIVERSITY, Jiangsu (CN)

(72) Inventors: Jinzhong Lu, Jiangsu (CN); Liujun Wu, Jiangsu (CN); Kaiyu Luo, Jiangsu (CN); Shijie Ji, Jiangsu (CN)

(73) Assignee: JIANGSU UNIVERSITY, Jiangsu (CN)

( * ) Notice: Subject to any disclaimer, the term of this patent is extended or adjusted under 35 U.S.C. 154(b) by 345 days.

(21) Appl. No.: 16/069,336

(22) PCT Filed: Jun. 8, 2017

(86) PCT No.: PCT/CN2017/087532
§ 371 (c)(1),
(2) Date: Jul. 11, 2018

(87) PCT Pub. No.: WO2018/196105
PCT Pub. Date: Nov. 1, 2018

(65) Prior Publication Data
US 2020/0181722 A1 Jun. 11, 2020

(30) Foreign Application Priority Data
Apr. 25, 2017 (CN) .......................... 201710273187.6

(51) Int. Cl.
*C21D 1/09* (2006.01)
*B24C 1/10* (2006.01)
(Continued)

(52) U.S. Cl.
CPC ............ *C21D 1/09* (2013.01); *B23K 26/0622* (2015.10); *B23K 26/0626* (2013.01);
(Continued)

(58) Field of Classification Search
CPC .......... C21D 1/09; C21D 7/06; C21D 10/005; C21D 8/00; B24C 1/10; B82Y 30/00;
(Continued)

(56) References Cited

U.S. PATENT DOCUMENTS

| 2009/0314758 A1* | 12/2009 | Ganesh ................. B23K 26/34 219/137 R |
| 2013/0180969 A1* | 7/2013 | Cheng ................. B23K 26/356 219/121.85 |
| 2016/0114462 A1 | 4/2016 | Keeskes et al. |

FOREIGN PATENT DOCUMENTS

| CN | 102560508 A | 7/2012 |
| CN | 103114185 A | 5/2013 |

(Continued)

OTHER PUBLICATIONS

Kangmin Chen et al., "Deformation Microstructures of Austenitic Stainless Steel 2Cr13Mn9Ni4 Under Ultrafast Strain Rate by Laser Shock Processing", Material Science and Engineering: A, vol. 587, Dec. 10, 2013, pp. 244-249 (Year: 2013).*
(Continued)

*Primary Examiner* — Tu B Hoang
*Assistant Examiner* — Aaron G Wright
(74) *Attorney, Agent, or Firm* — Saliwanchik, Lloyd & Eisenschenk

(57) ABSTRACT

Provided is a combined fabricating method for gradient nanostructure in the surface layer of a metal workpiece. A plastic deformation layer in great depth is induced by laser shock peening, then the surface of the metal workpiece is nanocrystallized by surface mechanical attrition treatment, and finally a gradient nanostructure is obtained in the surface layer of the metal workpiece with desirable layer thickness and optimized micro-structure distribution.

6 Claims, 2 Drawing Sheets

(51) Int. Cl.
*C21D 7/06* (2006.01)
*C21D 10/00* (2006.01)
*B23K 26/0622* (2014.01)
*B23K 26/06* (2014.01)
*B23K 26/073* (2006.01)
*B82Y 30/00* (2011.01)

(52) U.S. Cl.
CPC .............. *B23K 26/073* (2013.01); *B24C 1/10* (2013.01); *C21D 7/06* (2013.01); *C21D 10/005* (2013.01); *B82Y 30/00* (2013.01)

(58) Field of Classification Search
CPC .. B82Y 40/00; B23K 26/0622; B23K 26/073; B23K 26/356
USPC ..... 219/121.85, 121.6; 29/90.7; 148/565, 97
See application file for complete search history.

(56) References Cited

FOREIGN PATENT DOCUMENTS

| CN | 103422098 | A | * | 12/2013 | |
|---|---|---|---|---|---|
| CN | 103422098 | A | | 12/2013 | |
| CN | 106467933 | A | | 3/2017 | |
| EP | 2565282 | A2 | * | 3/2013 | ............... C21D 7/06 |

OTHER PUBLICATIONS

Xiangfan Nie et al., "Effect Study and Application to Improve High Cycle Fatigue Resistance of TC11 Titanium Alloy by Laser Shock Peening with Multiple Impacts", Surface and Coatings Technology, vol. 253, Aug. 25, 2014, pp. 68-75). (Year: 2014).*

* cited by examiner

COMBINED FABRICATING METHOD FOR GRADIENT NANOSTRUCTURE IN SURFACE LAYER OF METAL WORKPIECE

CROSS REFERENCE TO RELATED APPLICATIONS

This application is a National Stage Application of International Application Number PCT/CN2017/087532, filed Jun. 8, 2017; which claims priority to Chinese Application No. 201710273187.6, filed Apr. 25, 2017.

TECHNICAL FIELD

The present invention relates to the field of surface engineering technology and laser shock peening technology, in particular to a combined fabricating method for gradient nanostructure in the surface layer of a metal workpiece.

BACKGROUND ART

Nano-metal materials have advantages including high strength and hardness, good physical properties, high wear resistance, and good hot-workability, etc. Through nanocrystallization of the structure, the material strength and hardness can be increased by several times or even tens of times, without changing the chemical composition of the material. The report of Emerging Science and Technology Trends: 2016-2045 issued by the US Military in 2016 puts forward 24 emerging science and technology trends that are likely to have a major impact in the next 30 years, among which the research on preparation and performance of advanced materials, especially nanometer materials, was listed. As the strength and hardness are increased significantly, the plasticity and toughness of nanostructured materials are severely decreased, the work hardening ability disappears, and the structural stability is degraded. Those drawbacks limit the application and development of nanostructured materials. As high strength and lighter weight materials are now primarily used for engineering structures, conventional homogeneous materials, such as coarse crystalline materials and nanostructured materials, cannot meet the performance requirements for engineering structural parts in extreme service environments anymore. The research made by Ke Lu, an academician of Institute of Metal Research, Chinese Academy of Sciences, indicated that: the strength of metal materials is increased at the cost of the plasticity of the coarse crystalline or nanostructure, and the overall strength-plasticity performance of random mixtures of coarse grains with nanograins is not high. However, gradient nanostructured materials exhibit excellent overall strength-plasticity performance. Gradient nanostructured magnesium alloys formed on the basis of plastic deformation incorporate the properties of nanograins and the properties of coarse grains, can effectively overcome the drawbacks of low plasticity and low toughness of nanostructure, significantly improve the strength, wear resistance, and thermostability of the metal materials, and maximize the overall performance of the metal materials.

Laser shock peening (LSP) is a new surface strengthening technique, which mainly employs laser irradiation with high-peak power density (>109 W/cm2) in the form of short pulses (several tens of nanoseconds) on a metal's surface, the laser beam is absorbed by an absorption layer after it passes through a confinement layer, and thereby the absorption layer obtains energy and undergoes explosive gasification and evaporation, and produces high-temperature and high-pressure plasma; under a confinement effect of the outer confinement layer, the plasma forms a high-pressure shock wave, which is propagated into the material, the surface layer of the material has plastic deformation under a force effect of the shock wave, so that the microstructure of the material in the surface layer is changed, and thereby an effect of grain refinement is attained, and even gradient nanostructure can be generated in the surface layer of a metal material with a low melting point (e.g., magnesium alloy, brass, etc.). Besides, the depth of the residual stress layer may be up to 1~2 mm (5~10 times of that achieved by shot peening), and thereby the strength, hardness, wear resistance, and stress corrosion resistance properties of the material can be improved. However, owing to the existence of the absorption layer, the laser does not ablate the surface of the material or cause high temperature on the surface of the material. Therefore, LSP only utilizes the force effect of the laser beam but does not utilize the heat effect of the laser beam, and belongs to a cold processing technique. For a metal material with a high melting point (e.g., titanium alloy, etc.), the recrystallization temperature is relatively high, and gradient submicron structures are generated only in the surface layer of the metal.

Surface mechanical attrition treatment (SMAT) is the most effective process for forming gradient nanostructure in the surface layer of a metal. SMAT mainly utilizes balls that fly under the action of a vibration generator to cause plastic deformation in the surface layer of the metal at a high strain rate in random directions through strain accumulation, the strain magnitude and strain rate in the surface layer are decreased in a gradient manner as the depth is increased, the accumulative total strain magnitude is increased as the number of pressing cycles is increased, the impacted surface has plastic deformation and forms gradient nanostructure in varying sizes from surface to inside. Gradient nanostructure can be generated in the surface layer of a metal material with a high melting point (e.g., titanium alloy, etc.), owing to the fact that the balls impact the metal material directly in multiple directions, and the relative micro-friction between the balls and the metal material generates heat and causes increased temperature of the surface layer of the metal.

CONTENTS OF THE INVENTION

In view of the drawbacks in the prior art, to solve the above-mentioned problems, the present invention puts forward a combined fabricating method for gradient nanostructure in the surface layer of a metal workpiece. In the method, first, a plastic deformation layer in great depth is induced by LSP, then the surface of the metal workpiece is nanocrystallized by SMAT, and finally gradient nanostructure is obtained in the surface layer of the metal workpiece with desirable layer thickness and optimized micro-structure distribution.

The material of the metal workpiece is a metal material for key and important parts applied in the aeronautic and astronautic industry, automobile and ship-building industries, and chemical industry, etc., such as aluminum alloy, titanium alloy, magnesium alloy, stainless steel, and nickel-based superalloy, etc.

The LSP treatment process used is as follows: the surface of the metal workpiece to be treated is burnished and polished with abrasive paper of 500 #, 800 #, 1000 #, 1200 #, 1600 #, 2000 #and 2500 #sequentially first, and then the surface of metal workpiece to be treated is cleaned by ultrasonic cleaning with deionized water; the pulse width, pulse energy, frequency, spot diameter, and number of coverage layers of the LSP related with the metal workpiece material are determined, an absorption layer is attached to the surface of the metal workpiece to be treated, and then the areas of the metal workpiece to be shocked are treated by massive overlapped LSP.

In the LSP treatment process, the pulse width is 8~30 ns, the pulse energy is 2~15 J, the frequency is 1 Hz, the spot diameter is 2~3 mm, the overlap ratio of the spot in transverse direction and longitudinal direction is 50%, the number of coverage layers is 1~3, the absorption layer is aluminum foil produced by 3M company of US specially for LSP, the confinement layer is water film formed in 1~2 mm thickness by deionized water flow, the peak pressure of the pulses is $P_1$, the pressure at the edges of the spot is $P_2$, and $$2\sigma_H \leq P_1 \leq 2.5\sigma_H, P_2 \geq \sigma_H, \text{ where, } \sigma_H = \sigma_Y^{dyn}\frac{(1-v)}{(1-2v)},$$

$\sigma_Y^{dyn}$ is dynamic yield strength, and v is the Poisson's ratio of the material; the entire spot area subjected to LSP has dynamic plastic deformation, while the metal workpiece in the central area of the spot has no macroscopic deformation.

Through the LSP treatment, a deep plastic deformation layer is induced in the surface layer of the metal workpiece, and a deep nanometer or sub-micrometer gradient structural layer can be formed.

The SMAT process used is as follows: absorption layer on the surface of the metal workpiece is removed first after the LSP treatment, and then the surface of the metal workpiece is cleaned by ultrasonic cleaning with deionized water; the vibration frequency, ball diameter and treatment time of SMAT related with the material of the metal workpiece are determined, and then the shocked surface of the metal workpiece is treated by SMAT on that basis.

In the SMAT process, the vibration frequency is 50 Hz, the ball diameter is 6~8 mm, and the treatment time is 5~60 min.

Through the SMAT, a nanometer gradient structural layer is obtained in the surface layer of the metal workpiece where nanocrystallization is difficult to attain by LSP, and deeper nanometer gradient structural layer and better nanometer-submicron-micrometer gradient structural layer are obtained in the surface layer of the metal workpiece where nanocrystallization has been attained by LSP.

The measurement result indicates: in the gradient nanostructured layer prepared with the controlled combined fabricating method for gradient nanostructure in the surface layer of a metal workpiece, thickness of the nanostructured layer is 30~50 μm, thickness of the submicron structural layer is 80~200 μm, and thickness of the entire grain refined layer is 800~1,300 μm.

The present invention attains the following beneficial effects:

(1) The method provided in the present invention effectively realizes controlled and combined preparation of gradient nanostructure in the surface layer of a metal workpiece (aluminum alloy, titanium alloy, magnesium alloy, stainless steel, nickel-based superalloy, and magnesium alloy, etc.), and provides a novel and effective method for strengthening and reparation of key and important metal parts in the aeronautic and astronautic industry, automobile manufacturing and ship building industries, and chemical industry, etc.;

(2) With the method provided in the present invention, gradient nanostructure in desirable layer thickness can be obtained in the surface layer of the metal workpiece material, and the micro-structural distribution of gradient nanostructure in the surface layer can be optimized, and a practical method is put forward innovatively on the basis of present technical feasibility against present technical limitations;

(3) With the method provided in the present invention, the surface roughness of the metal workpiece material is effectively improved, the surface quality of the metal workpiece material is effectively improved, and the cost of post-treatment of the surface of the metal workpiece is effectively reduced;

(4) The method provided in the present invention breaches the "reversed relationship" between material strength and plasticity of metal workpieces, ensures coexistence of good plasticity and high strength, and greatly improves overall mechanical properties of metal workpieces, including fatigue life and wear resistance, etc.

DESCRIPTION OF DRAWINGS

To describe the embodiments of the present application and the technical solutions in the prior art clearly, hereunder the accompanying drawings necessary for describing the embodiments or the prior art will be introduced briefly.

FIG. 3(*a*) shows a TEM image of the surface layer of a sample subjected to LSP; FIG. 3(*b*) shows a TEM image of the surface layer of a sample treated by LSP first and then by SMAT;

FIG. 4(*a*) shows a TEM image of the surface layer of a sample subjected to LSP; FIG. 4(*b*) shows a TEM image of the surface layer of a sample treated by LSP first and then by SMAT.

EMBODIMENTS

Hereunder the embodiments of the present invention will be detailed in embodiments with reference to the accompanying drawings, but the present invention is not limited to those embodiments.

Embodiment 1

Figure 1:
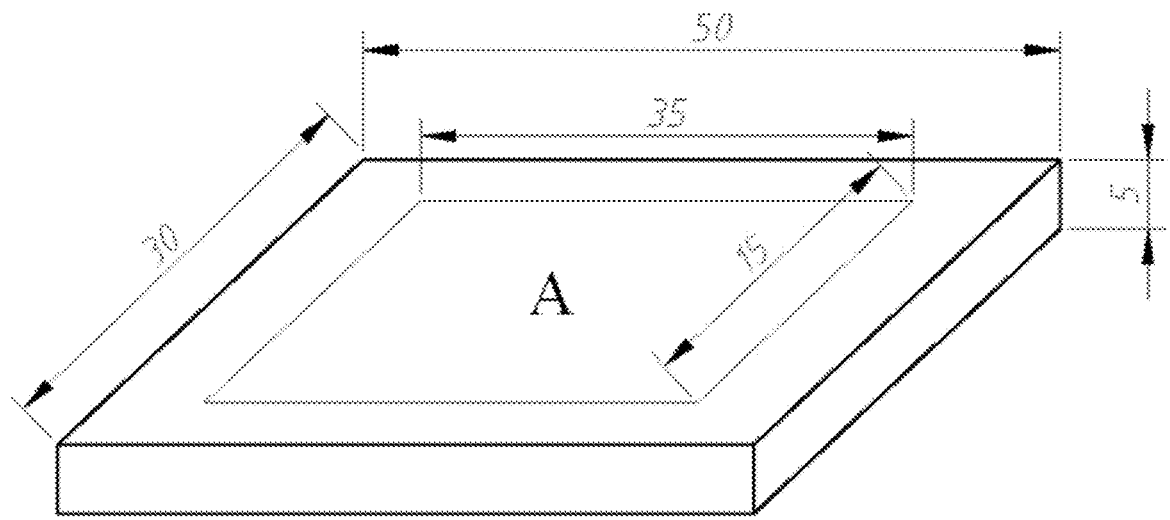
FIG. 1 is a schematic diagram of sample size in two embodiments.
Figure 2:
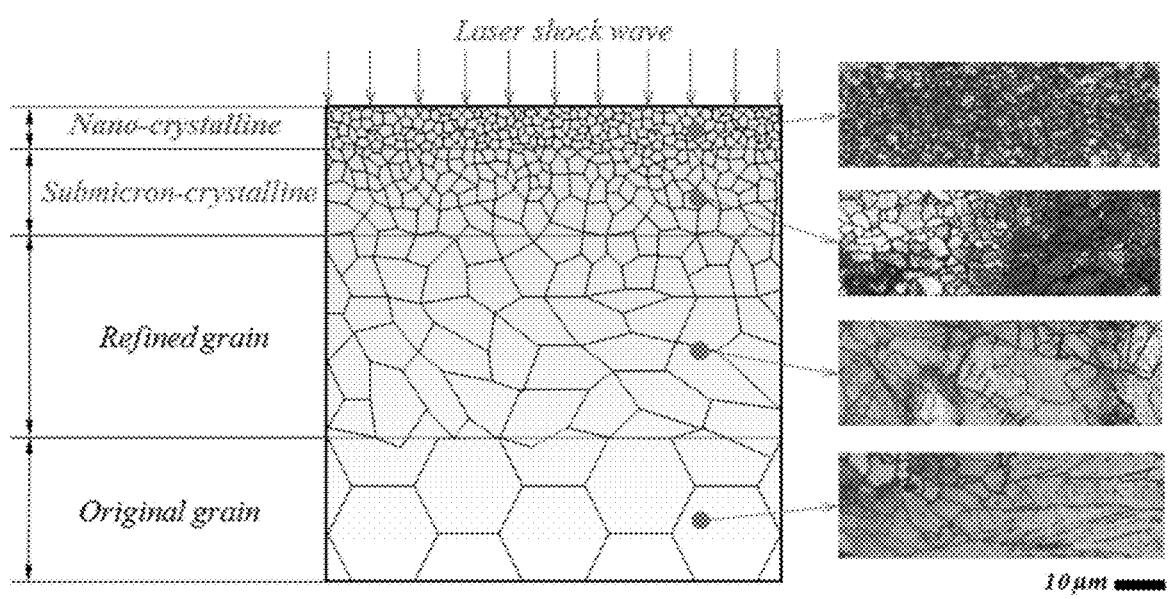
FIG. 2 is a schematic diagram of gradient change of the grain size of AM50 magnesium alloy along the depth direction.

An example of preparing gradient nanostructure in the surface layer of magnesium alloy with the method described above, including the following steps:

(1) Two AM50 magnesium alloy samples in 30 mm×50 mm×5 mm dimensions are selected for comparison test, the two samples are denoted as sample 1 and sample 2 respectively, and the treated area A is shown in FIG. 1.

(2) LSP treatment is carried out in the area A determined in the step (1) for the sample 1 and sample 2, wherein, the parameters of LSP are as follows: the spot is in a circular shape in 3 mm diameter, the pulse width is 10 ns, the pulse energy is 12 J, the overlap ratio in the transverse direction and longitudinal direction is 50%, and the number of coverage layers is 1.

(3) The sample 2 is treated by SMAT, wherein, the parameters of SMAT are as follows: the vibration frequency of the system is 50 Hz, the ball diameter is 8 mm, and the treatment time is 30 min.

Figure 3A:
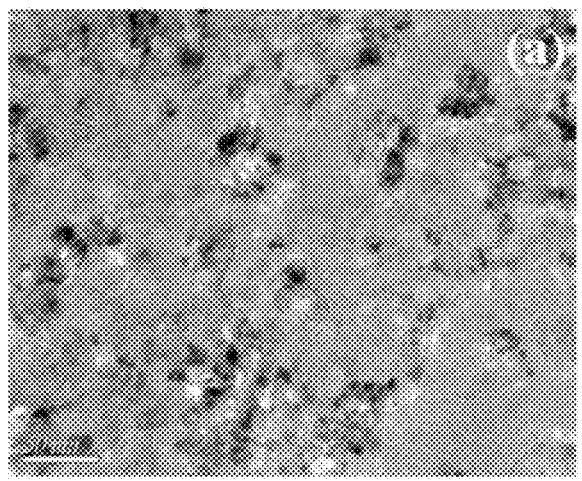
FIG. 3A-3B show TEM images of the surface layer of AM50 magnesium alloy.
Figure 3B:
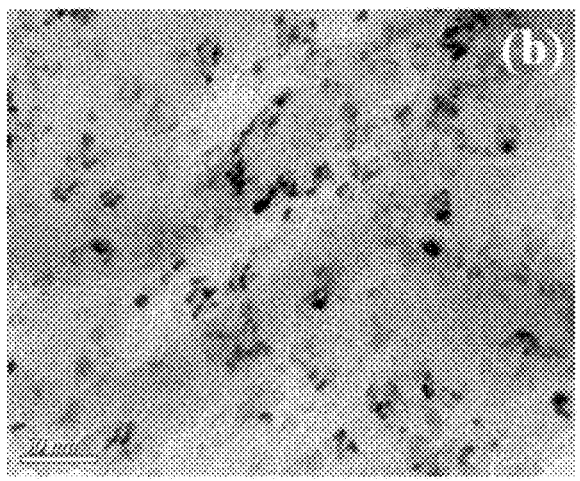

As shown in FIG. 3, wherein, FIG. 3(a) shows a TEM image of the surface layer of the sample 1, and FIG. 3(b) shows a TEM image of the surface layer of the sample 2. In the sample 1, the average grain size is about 50 nm, the gradient nanostructure are in about 30 μm depth, and the compressive residual stress layer is in about 1 mm depth. In the sample 2, the average grain size is about 20 nm, the gradient nanostructure are in about 50 μm depth, and the compressive residual stress layer is in about 1 mm depth. The depth of the compressive residual stress layer in the sample 1 and the depth of the compressive residual stress layer in the sample 2 are close to each other, owing to the fact that the depth of the compressive residual stress layer induced by SMAT is smaller than the depth of the compressive residual stress layer induced by LSP. However, the refined grains obtained by LSP are only induced by the force effect created by laser shock, while SMAT not only utilizes the force effect but also utilizes the heat effect, and thereby provides temperature required for recrystallization, and the grain size in the surface of the sample is smaller as a result.

Embodiment 2

An example of preparing gradient nanostructure in the surface layer of copper alloy with the method described above, including the following steps:

(1) Two H62 brass samples in 30 mm×50 mm×5 mm dimensions are selected for comparison test, the two samples are denoted as sample 1 and sample 2 respectively, and the treated area A is shown in FIG. 1.

(2) LSP treatment is carried out in the area A determined in the step (1) for the sample 1 and sample 2, wherein, the parameters of LSP are as follows: the spot is in a circular shape in 3 mm diameter, the pulse width is 10 ns, the pulse energy is 6 J, the overlap ratio in the transverse direction and longitudinal direction is 50%, and the number of coverage layers is 1.

(3) The sample 2 is treated by SMAT, wherein, the parameters of the surface mechanical attrition are as follows: the vibration frequency of the system is 50 Hz, the ball diameter is 8 mm, and the treatment time is 15 min.

Figure 4A:
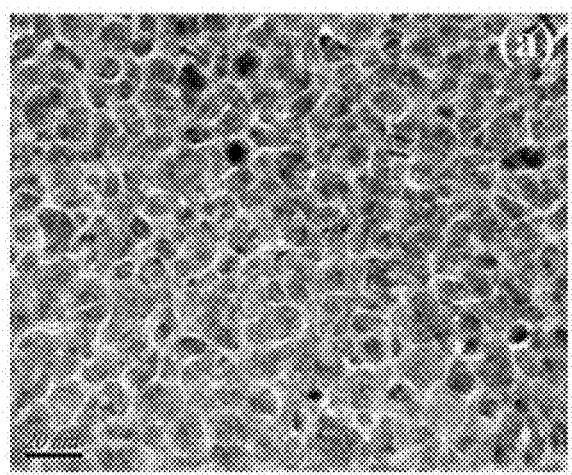
FIG. 4A-4B show TEM images of the surface layer of H62 brass.
Figure 4B:
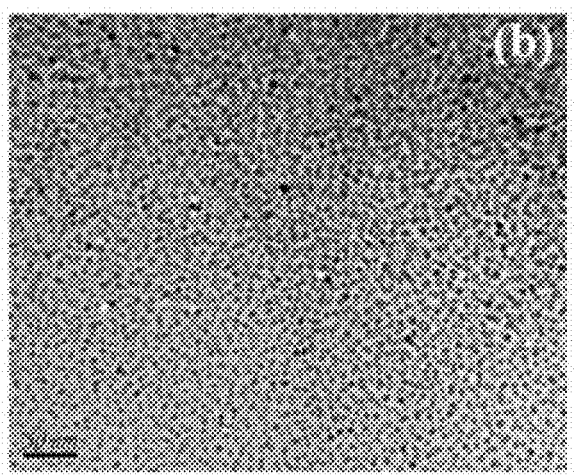

As shown in FIG. 4, wherein, FIG. 4(a) shows a TEM image of the surface layer of the sample 1, and FIG. 4(b) shows a TEM image of the surface layer of the sample 2. In the sample 1, the average grain size is about 15 nm, the gradient nanostructure are in about 50 μm depth, and the compressive residual stress layer is in about 1 mm depth. In the sample 2, the average grain size is about 10 nm, the gradient nano structure are in about 60 μm depth, and the compressive residual stress layer is in about 1 mm depth.

Both of the embodiments demonstrate: compared with sole LSP treatment, the nanometer grain size in the surface layer of the metal material prepared with the method provided in the present invention is obviously decreased, and the depth of the gradient nanostructure is increased effectively. Owing to the fact that the compressive residual stress layer caused by LSP has greater depth, the depth values of the compressive residual stress layers in the sample 1 and the sample 2 in the two embodiments are close to each other and almost the same.

The invention claimed is:

1. A combined fabricating method for a gradient nanostructure in a surface of a metal workpiece, the method comprising:

performing a laser shock peening (LSP) treatment on the surface of the metal workpiece to induce a plastic deformation layer on the surface of the metal workpiece;

after performing the LSP treatment, then performing a surface mechanical attrition treatment (SMAT) on the surface of the metal workpiece to nanocrystallize the surface of the metal workpiece; and after performing the SMAT, finally obtaining the gradient nanostructure in the surface of the metal workpiece with a desirable layer thickness and an optimized micro-structure distribution, wherein the method further comprises:

(1) prior to performing the LSP treatment, burnishing, polishing, and performing a first cleaning of the surface of the metal workpiece;

(2) prior to performing the LSP treatment, determining a pulse width, a pulse energy, a frequency, a spot diameter, and a number of coverage layers of LSP related with a material of the metal workpiece, and attaching an absorption layer to the surface of the metal workpiece, wherein the performing of the LSP treatment comprises performing a massive overlapped LSP treatment on areas of the surface of the metal workpiece;

(3) removing the absorption layer on the surface of the metal workpiece after the areas of the surface of the metal workpiece are treated by massive overlapped LSP, and performing a second cleaning of the surface of the metal workpiece; and (4) determining a vibration frequency, a ball diameter, and a treatment time of SMAT related with the material of the metal workpiece, wherein the SMAT on the surface of the metal workpiece is performed based on the vibration frequency, the ball diameter, and the treatment time of SMAT related with the material of the metal workpiece.

2. The according to claim 1, the wherein the material of the metal workpiece is a metal material used in the aeronautic and astronautic industry, automobile and ship-building industries, and chemical industry, and wherein the material of the metal workpiece comprises aluminum alloy, titanium alloy, magnesium alloy, stainless steel, or nickel-based superalloy.

3. The method according to claim 1, wherein in the surface of the metal workpiece, after the obtaining of the gradient nanostructure, a thickness of a nanostructured layer is 30~50, a thickness of a submicron structural layer is 80~200 and a thickness of an entire grain refined layer is 800~1,300 μm.

4. The method according to claim 1, wherein, during the LSP treatment, the pulse width is 8~30 ns, the pulse energy is 2~15 J, the frequency is 1 Hz, the spot diameter is 2~3 mm, an overlap ratio of a spot in a transverse direction and a longitudinal direction is 50%, a number of coverage layers is 1~3, a confinement layer is water film formed in 1~2 mm thickness by deionized water flow, a peak pressure of the pulses is P1, a pressure at edges of the spot is P2, and $$2\sigma_H \leq P_1 \leq 2.5\sigma_H,\ P_2 \geq \sigma_H,\ \text{where},\ \sigma_H = \sigma_Y^{dyn}\frac{(1-v)}{(1-2v)},$$

$\sigma_Y^{dyn}$ is dynamic yield strength, and v is the Poisson's ratio of the material, and wherein an entire spot area subjected to the LSP treatment has dynamic plastic deformation, while the metal workpiece in a central area of the spot has no macroscopic deformation.

5. The method according to claim 1, wherein the vibration frequency is 50 Hz, the ball diameter is 6~8 mm, and the treatment time is 5~60 min.

6. The method according to claim 2, wherein the burnishing, polishing, and performing of the first cleaning of the surface of the metal workpiece comprises:
burnishing and polishing the surface of the metal workpiece with abrasive paper of 500 #, 800 #, 1000 #, 1600 #, 2000 #, and 1500 #, sequentially; and
then cleaning the surface of the metal workpiece by ultrasonic cleaning with deionized water.

* * * * *